(12) United States Patent
Christy et al.

(10) Patent No.: US 9,195,986 B2
(45) Date of Patent: Nov. 24, 2015

(54) VIN SCAN/CODE CATALOG AND INFORMATION LOOKUP

(75) Inventors: Robert C. Christy, Bixby, OK (US); Johnny Thao, Tulsa, OK (US); Scott Wilson, Tulsa, OK (US); Sherry M. Mathis, Broken Arrow, OK (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 484 days.

(21) Appl. No.: 13/492,957

(22) Filed: Jun. 11, 2012

(65) Prior Publication Data

US 2013/0332488 A1 Dec. 12, 2013

(51) Int. Cl.
*G06Q 30/00* (2012.01)
*G06Q 30/06* (2012.01)

(52) U.S. Cl.
CPC ............ *G06Q 30/01* (2013.01); *G06Q 30/0603* (2013.01)

(58) Field of Classification Search
CPC .......... G06F 3/04842; G06F 17/30522; G06Q 30/02; G06Q 30/0257; G06Q 30/0261; G06Q 30/0273; G06Q 30/0277; G06Q 30/01; G06Q 30/0603
See application file for complete search history.

(56) References Cited

U.S. PATENT DOCUMENTS

| 6,052,065 A * | 4/2000 | Glover ........................ 340/10.42 |
|---|---|---|
| 6,961,687 B1 * | 11/2005 | Myers et al. ....................... 703/6 |
| 8,135,506 B2 | 3/2012 | Hansen et al. |
| 8,176,145 B1 | 5/2012 | Stender et al. |
| 8,188,861 B2 | 5/2012 | Pederson |
| 8,194,646 B2 | 6/2012 | Elliott et al. |
| 2002/0087578 A1 | 7/2002 | Vroman |
| 2002/0151992 A1 | 10/2002 | Hoffberg et al. |
| 2003/0051021 A1 * | 3/2003 | Hirschfeld et al. ........... 709/223 |
| 2003/0055812 A1 * | 3/2003 | Williams et al. .................. 707/1 |
| 2004/0059618 A1 * | 3/2004 | Ford et al. ......................... 705/8 |
| 2004/0110472 A1 * | 6/2004 | Witkowski et al. .......... 455/41.2 |
| 2005/0242189 A1 * | 11/2005 | Rohs ........................ 235/462.46 |
| 2006/0167760 A1 * | 7/2006 | Chakraborty et al. .......... 705/26 |
| 2007/0189579 A1 | 8/2007 | Crookham et al. |
| 2009/0132813 A1 | 5/2009 | Schibuk |
| 2010/0185638 A1 | 7/2010 | Wright et al. |
| 2010/0190510 A1 | 7/2010 | Maranhas et al. |
| 2010/0191578 A1 | 7/2010 | Tran et al. |
| 2011/0225047 A1 * | 9/2011 | Breed et al. ................. 705/14.55 |
| 2012/0233044 A1 | 9/2012 | Burger et al. |
| 2012/0246039 A1 | 9/2012 | Fain et al. |
| 2013/0014222 A1 | 1/2013 | Bhatia et al. |

OTHER PUBLICATIONS

International Search Report and Written Opinion, PCT/US2013/043972 (Dec. 19, 2013).

(Continued)

*Primary Examiner* — Dinku Gebresenbet
(74) *Attorney, Agent, or Firm* — Thompson Hine LLP

(57) ABSTRACT

Electronic-based systems and methods for enhancing a user's experience when shopping for components of a mechanical or electrical device or apparatus, which include downloadable software (i.e., a mobile device application) that provides access to component information/data using the mobile device, in particular component information/data provided by a manufacturer from its personal database, electronic devices that include such software, and methods of accessing the component information and optionally, acting upon the information to order the component.

13 Claims, 5 Drawing Sheets

(56) References Cited

OTHER PUBLICATIONS

Website featuring "Automotix Mobile: Car Parts Application" by Automotix, http://www.automotix.net/mobile/ (retrieved from the internet on Apr. 3, 2012).

Website featuring "WORLDPAC", http://www.appsmenow.com/review/46170-WORLDPAC (Aug. 8, 2012).

"F.Y.I," Motor, p. 44 (Dec. 2012).

"Worldpac Announces Mobile VIN Decoder App for Speeddial catalog" from web page of Motor Age, http://www.searchautoparts.com/motorage/news-service-repair/worldpac-announces-mob . . . (Oct. 24, 2012).

US, Office Action issued on Feb. 27, 2015 regarding U.S. Appl. No. 14/526,626.

* cited by examiner

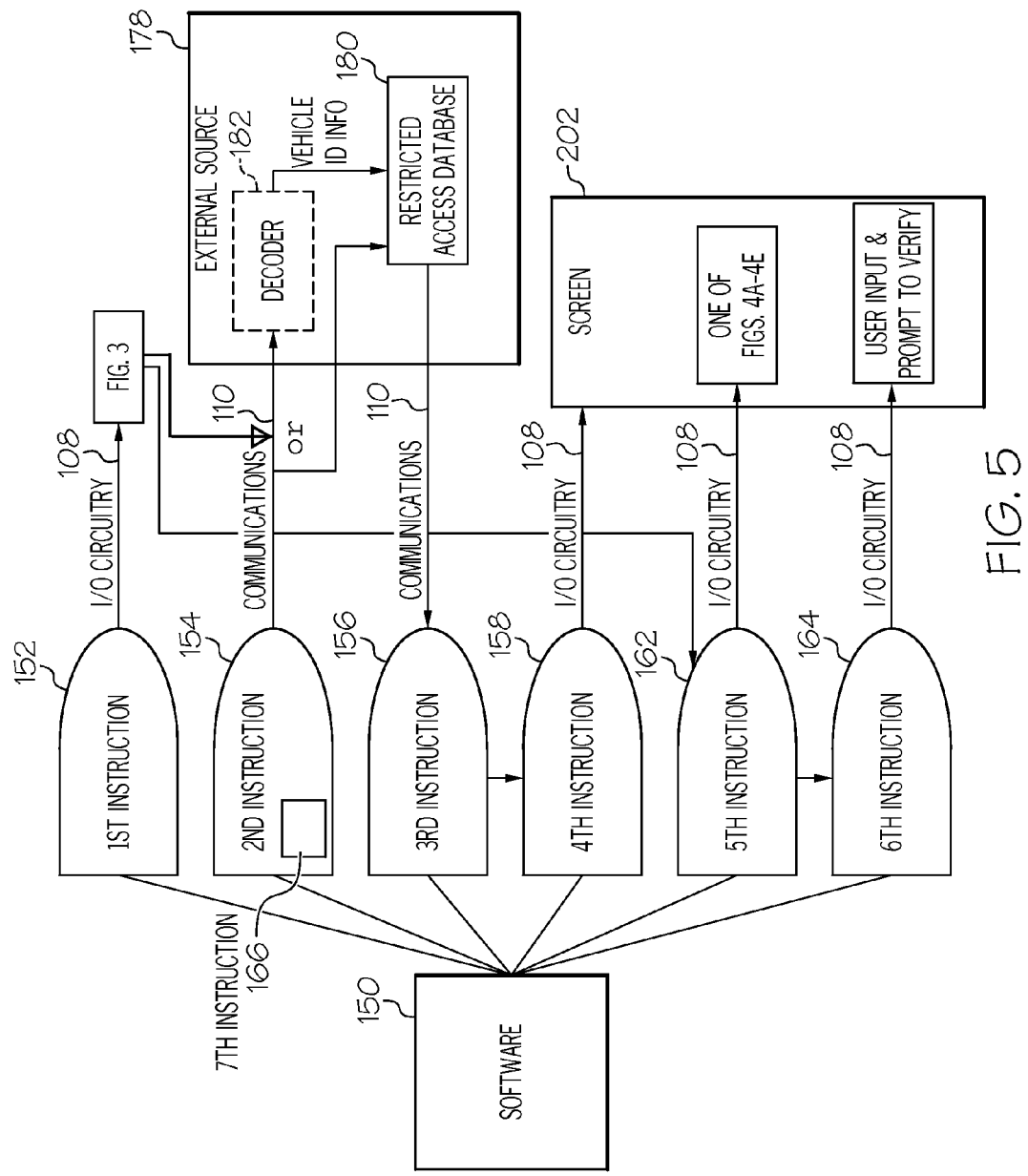

VIN SCAN/CODE CATALOG AND INFORMATION LOOKUP

TECHNICAL FIELD

The present invention relates generally to providing access to component information/data using a portable electronic device, such as vehicle part information/data, provided by an identified component manufacturer from their personal database.

BACKGROUND

Currently when customers search the web for parts and associated information for their vehicle their search can yield incorrect product information, counterfeit parts and also parts sold by unauthorized dealers. Placing a call to a local auto parts store in search for specific manufacturer parts can result in several calls before the appropriate part is found. Moreover, the local auto parts store may not be able to identify a part for the make, model, year, type and/or engine of a vehicle with 100% accuracy or may be motivated by other market factors to recommend an alternate or inferior part.

When a vehicle is in need of repair or maintenance and requires a specific part, some vehicle owners may go to a local auto parts store to search for a specific manufacturer's part. However, there is no guarantee that the particular auto parts store carries that manufacturer's parts. The search for the desired part may require visits to several stores before the part is found. Such a process is time consuming and a waste of gas. There are other means to look up vehicle parts by manufacturer, including a paper catalog, an internal electronic cataloging system, or a licensed cataloging system.

These available methods of locating a component by its manufacturer are also limited with respect to the information that accompanies the component. For example, an automotive component found in the local automotive part retailer may come in a box with a sheet of limited information about the component and/or its installation. The purchaser may likely benefit from having more information such as videos, technical information, images, and part specifications. The internal or licensed catalogs also suffer from the expense and time lapse in updating the information. If the owner of the cataloging system is not diligent in requesting the up-dates, the information available may be inaccurate.

The above listed issues can be remedied if the process for obtaining identification of and information related to component parts was automated. Through the use of personal mobile devices, devices located at a point of service such as an auto repair shop or an auto parts store, or other electronic devices, customers and service providers can obtain the needed vehicle part information and at the same time receive additional instructions, videos, technical and other information, images and specifications directly from the manufacturer. These would make for a more informed customer and or service provider and prevent the purchasing of counterfeit parts and or purchasing parts from an unauthorized dealer.

SUMMARY

One aspect of the invention includes software for performing a component lookup in the database of an identified component manufacturer. The software is storable in an electronic device and includes a first instruction executable by the electronic device to provide a user a display from which to select a means for a component lookup in a restricted access database of an identified component manufacturer, an access code to the restricted access database, a second instruction executable by the electronic device to export the access code and any information provided in response to the selection of the means for the component lookup to an external source, a third instruction executable by the electronic device to import data from the restricted access database about a component found during the user selected component lookup, and a fourth instruction executable by the electronic device to display the data.

In one embodiment, the data from the restricted access data base may include one or more of a summary of the component, a description of the component, a picture of the component, a component number, instructions regarding installation, a video regarding installation, a video describing the component, a brochure about the component, a specification sheet regarding the component, availability of the component including retail locations, price estimates for the component (such as an average retail price), manuals related thereto, and ordering instructions for the component.

In another aspect, electronic devices are disclosed that include a device for importing a vehicle identification number (VIN) or code containing said VIN, communication circuitry comprising signal transmitting and signal receiving capability, an information processor to process the information received by the signal receiving capability of the communication circuitry into a displayable form, and a display to display the information once in a displayable form. The signal transmitting capability sends the VIN to a database external to the electronic device to lookup component information related to the VIN and the signal receiving capability receives information sent back to the electronic device in response to the lookup of component information, and the information received is from a restricted access database of component-related information from an identified component manufacturer.

In another aspect, methods are disclosed for accessing the contents of an identified component manufacturer's database of part-related information. The methods include providing software that is storable in an electronic device, providing a database of component-related data specific to one component manufacturer stored on a password protected server, and providing a mobile site as a communication link between the electronic device and the database. The software enables a user to initiate a component lookup by one or more of browsing a catalog, scanning or reading a vehicle identification number (VIN), manually entering a VIN, entering a part number, entering another manufacturer's part number or part name and the mobile site accesses the database in response to the user initiated component lookup. The method also includes the software instructing the electronic device to communicate with the database to use the user initiated component lookup to lookup component related data stored therein and to send said data to the electronic device for display.

BRIEF DESCRIPTION OF THE DRAWINGS

The above and other features of the invention, its nature and various advantages will be more apparent upon consideration of the following detailed description, taken in conjunction with the accompanying drawings.

FIG. 5 is a schematic view of the communications between software operable to perform the component lookup and a restricted access database where the desired information/data is stored.

DETAILED DESCRIPTION

Figure 1:
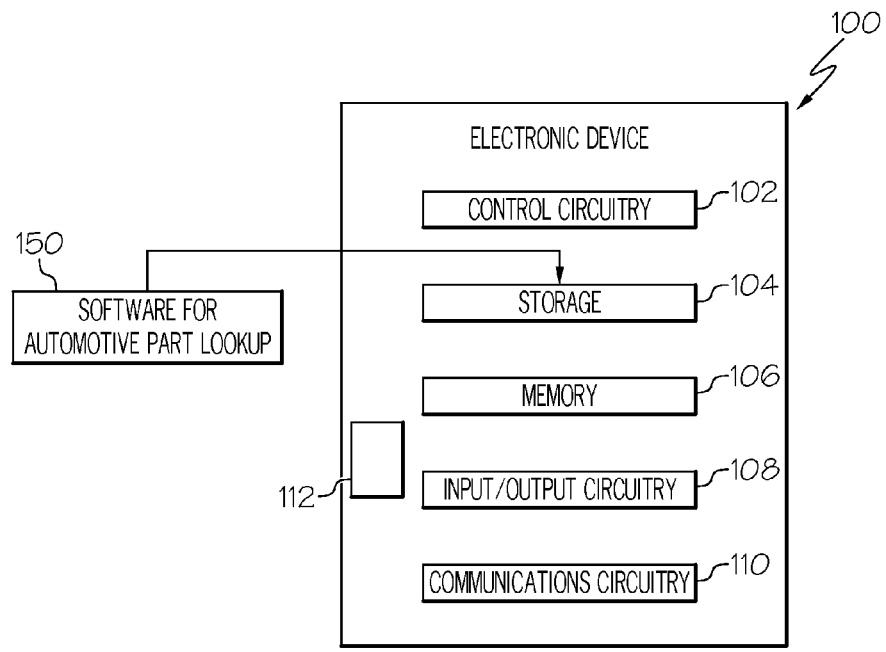
FIG. 1 is a schematic view of an illustrative electronic device for providing an application operative to interface with a database containing component part information/data in accordance with some embodiments of the invention.

The following detailed description will illustrate the general principles of the invention, examples of which are additionally illustrated in the accompanying drawings. In the drawings, like reference numbers indicate identical or functionally similar elements.

The present inventions include downloadable software (i.e., a mobile device application) that provides access to component information/data using an electronic device, in particular component information/data stored in a personal database (also known as original source data) of a component manufacturer, electronic devices that include such software, methods of accessing the component information, and, optionally, acting upon the information to order the component. In one embodiment, the component is a vehicle part, which is what will be used for exemplary purposes herein. However, the invention is not limited thereto and is applicable to any component of any mechanical device. In some instances, the component is a replacement part and the end user may be a do-it yourselfer or the retail store that sells the component. In other instances, the component may be an original equipment manufacturer ("OEM") component being installed at the factory level. Here, the OEM may use the database to coordinate proper installation in the correct vehicle or device and may acquire information about the availability of the components. The component manufacturer's database is typically the sort of information that is backed up daily and updated frequently to reflect the most accurate component related information.

A "vehicle" as used herein, is any device that is used for ground-based, air, or water transportation. For example, a vehicle may be an automobile, a car, a bus, a truck, a tractor, a riding lawn-mower, a tank, a motorcycle, a train, an airplane, a watercraft such as a ship or boat, an all-terrain vehicle, or a snow mobile.

"Vehicle identification number" as used herein means any format of vehicle identification affiliated with a vehicle for identification of one or more of the make, model, year, type and engine thereof. This information may be in various formats such as, but not limited to, a number sequence, a bar code, a quick reference code, or hereinafter developed computer readable media.

FIG. 1 is a schematic view of an illustrative electronic device for providing an application operative to interface with automotive part information/data stored in a database of a single automotive part manufacturer. Electronic device 100 can include control circuitry 102, storage 104, memory 106, input/output ("I/O") circuitry 108, and communications circuitry 110. In some embodiments, one or more of the components of electronic device 100 can be combined or omitted (e.g., storage 104 and memory 106 may be combined). In some embodiments, electronic device 100 can include other components not combined or included in those shown in FIG. 1 (e.g., motion detection components, a power supply such as a battery or kinetics, a display, bus, a positioning system, an input mechanism, etc.), or several instances of the components shown in FIG. 1. For the sake of simplicity, only one of each of the components is shown in FIG. 1.

Electronic device 100 can include any suitable type of electronic device. For example, electronic device 100 can include a portable electronic device that the user may hold in his or her hand, such as a digital media player (e.g., an iPod™ made available by Apple Inc. of Cupertino, Calif.), a personal e-mail device (e.g., a Blackberry™ made available by Research in Motion of Waterloo, Ontario), a personal data assistant ("PDA"), a cellular telephone, a handheld gaming device, and a digital camera. As another example, electronic device 100 can include a larger portable electronic device, such as a laptop computer. As yet another example, electronic device 100 can include a substantially fixed electronic device, such as a desktop computer.

Control circuitry 102 can include any processing circuitry or processor operative to control the operations and performance of electronic device 100. For example, control circuitry 102 can be used to run operating system applications, firmware applications, media playback applications, media editing applications, or any other application. In some embodiments, control circuitry 102 can drive a display and process inputs received from a user interface.

Storage 104 can include, for example, one or more storage mediums including a hard-drive, solid state drive, flash memory, permanent memory such as ROM, any other suitable type of storage component, or any combination thereof. Storage 104 can store, for example, media data (e.g., music and video files), application data (e.g., for implementing functions on electronic device 100), firmware, user preference information data (e.g., media playback preferences), authentication information (e.g. libraries of data associated with authorized users), lifestyle information data (e.g., food preferences), exercise information data (e.g., information obtained by exercise monitoring equipment), transaction information data (e.g., information such as credit card information), wireless connection information data (e.g., information that can enable electronic device 100 to establish a wireless connection), subscription information data (e.g., information that keeps track of podcasts or television shows or other media a user subscribes to), contact information data (e.g., telephone numbers and email addresses), calendar information data, and any other suitable data or any combination thereof.

Memory 106 can include cache memory, semi-permanent memory such as RAM, and/or one or more different types of memory used for temporarily storing data. In some embodiments, memory 106 can also be used for storing data used to operate electronic device applications, or any other type of data that can be stored in storage 104. In some embodiments, memory 106 and storage 104 can be combined as a single storage medium.

I/O circuitry 108 can be operative to convert (and encode/decode, if necessary) analog signals and other signals into digital data. In some embodiments, I/O circuitry 108 can also convert digital data into any other type of signal, and vice-versa. For example, I/O circuitry 108 can receive and convert physical contact inputs (e.g., from a multi-touch screen), physical movements (e.g., from a mouse or sensor), analog audio signals (e.g., from a microphone), or any other input. The digital data can be provided to and received from control circuitry 102, storage 104, memory 106, or any other component of electronic device 100. Although I/O circuitry 108 is illustrated in FIG. 1 as a single component of electronic device 100, several instances of I/O circuitry 108 can be included in electronic device 100.

Electronic device 100 can include any suitable interface or component for allowing a user to provide inputs to I/O circuitry 108. For example, electronic device 100 can include any suitable input mechanism, such as for example, a button, keypad, dial, a click wheel, or a touch screen. In some embodiments, electronic device 100 can include a capacitive sensing mechanism, or a multi-touch capacitive sensing mechanism.

In some embodiments, electronic device 100 can include specialized output circuitry associated with output devices such as, for example, one or more audio outputs. The audio output can include one or more speakers (e.g., mono or stereo speakers) built into electronic device 100, or an audio component that is remotely coupled to electronic device 100 (e.g., a headset, headphones or earbuds that can be coupled to communications device with a wire or wirelessly).

In some embodiments, I/O circuitry 108 can include display circuitry (e.g., a screen or projection system) for providing a display visible to the user. For example, the display circuitry can include a screen (e.g., an LCD screen) that is incorporated in electronic device 100. As another example, the display circuitry can include a movable display or a projecting system for providing a display of content on a surface remote from electronic device 100 (e.g., a video projector). In some embodiments, the display circuitry can include a coder/decoder (Codec) to convert digital media data into analog signals. For example, the display circuitry (or other appropriate circuitry within electronic device 100) can include video Codecs, audio Codecs, or any other suitable type of Codec.

The display circuitry also can include display driver circuitry, circuitry for driving display drivers, or both. The display circuitry can be operative to display content (e.g., media playback information, application screens for applications implemented on the electronic device, information regarding ongoing communications operations, information regarding incoming communications requests, or device operation screens) under the direction of control circuitry 102. Alternatively, the display circuitry can be operative to provide instructions to a remote display.

Communications circuitry 110 can include any suitable communications circuitry operative to connect to a communications network and to transmit communications (e.g., voice or data) from electronic device 100 to other devices within the communications network. Communications circuitry 110 can be operative to interface with the communications network using any suitable communications protocol such as, for example, Wi-Fi (e.g., a 802.11 protocol), Bluetooth™, radio frequency systems (e.g., 900 MHz, 1.4 GHz, and 5.6 GHz communication systems), infrared, GSM, GSM plus EDGE, CDMA, quadband, and other cellular protocols, VOIP, or any other suitable protocol.

In some embodiments, communications circuitry 110 can be operative to create a communications network using any suitable communications protocol. For example, communications circuitry 110 can create a short-range communications network using a short-range communications protocol to connect to other devices. For example, communications circuitry 110 can be operative to create a local communications network using the Bluetooth™ protocol to couple electronic device 100 with a Bluetooth™ headset.

Electronic device 100 can include one more instance of communications circuitry 110 for simultaneously performing several communications operations using different communications networks, although only one is shown in FIG. 1 to avoid overcomplicating the drawing. For example, electronic device 100 can include a first instance of communications circuitry 110 for communicating over a cellular network, and a second instance of communications circuitry 110 for communicating over Wi-Fi or using Bluetooth™. In some embodiments, the same instance of communications circuitry 110 can be operative to provide for communications over several communications networks.

In some embodiments, electronic device 100 can be coupled a host device for data transfers, synching the communications device, software or firmware updates, providing performance information to a remote source (e.g., providing riding characteristics to a remove server) or performing any other suitable operation that can require electronic device 100 to be coupled to a host device. Several electronic devices 100 can be coupled to a single host device using the host device as a server. Alternatively or additionally, electronic device 100 can be coupled to several host devices (e.g., for each of the plurality of the host devices to serve as a backup for data stored in electronic device 100).

Figure 2:
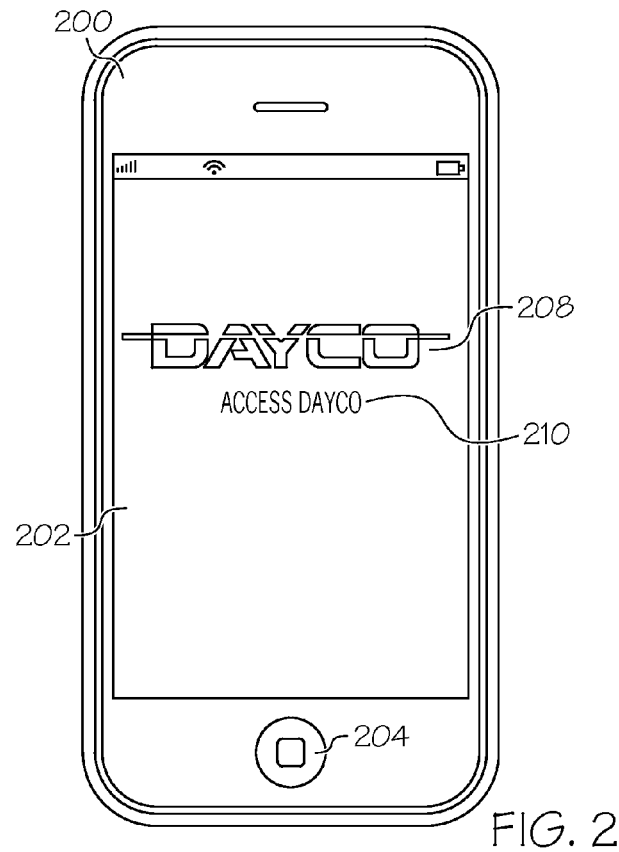
FIG. 2 is a front plan view of one embodiment of an electronic device housing downloaded software (an application) that provides a means for a component lookup.

FIG. 2 illustrates one embodiment of an electronic device, generally designated 200, that has a software program 150 stored therein (see FIG. 1) that provides a means for a component lookup such as an automotive part. The software program 150 may be downloadable into the electronic devices 100, 200. The electronic device 200 includes a display or screen 202 and input mechanism 204. While the input mechanism 204 is illustrated as a button, it is not limited thereto. The software 150 may include introductory instructions (not shown) that direct the I/O circuitry 108 (shown in FIG. 1) to display the manufacturer's name 208 so the user knows the source of the information to be returned and displayed during the component lookup. Optionally, the display may also include a trademark or brand name 210 for the service provided.

As schematically illustrated in FIG. 5, the software 150 may include a plurality of instructions 152, 154, 156, 158, and 162 and an access code that enable the systems within electronic device 200 to interact with a user such that the user can look up vehicle part information specific to one vehicle part manufacturer by accessing the contents of that particular vehicle part manufacturer's database 180. The information stored in the database is a compilation of data and information that coordinates vehicle parts to the vehicles they are operable in, what competitor's part it is a replacement for, and for each vehicle part information regarding how to maintain the part, a description thereof, a picture thereof, its part number and/or name, instructions regarding installation, a video regarding installation, a video describing the part, a brochure about the part, a specification sheet, availability of the vehicle part including retail locations, pricing, manuals, direct customer pricing, and/or ordering instructions. This data and information is valuable to the vehicle part manufacturer and is not available to the general public. Accordingly, the database is a restricted access database.

The access code may be a username and/or password. In one embodiment, each electronic device has its own username and/or password associated with the software downloaded therein and the restricted access database authenticates the username and password before data is released therefrom. In another embodiment only the password is required. In one embodiment the password is unique to the software stored on each electronic device. In these embodiments, the restricted access database may include a table coordinating the username and/or passwords with the id of the electronic device from which the username and/or password was received. In this manner the password and electronic device can be verified and/or authenticated. The authentication of the access code typically occurs before the third instruction 156, explained below, is executed. In another embodiment, the access code is one code stored in each version of the software, that may be the same in each version.

In another embodiment, the username and/or password are associated with a direct customer of the component manufacturer such as a distributor, retailer, or original equipment manufacturer, and the data from the restricted access database includes at least one of the direct customer's current price for the component and the availability of the component from the component manufacturer or a secondary source.

Figure 3:
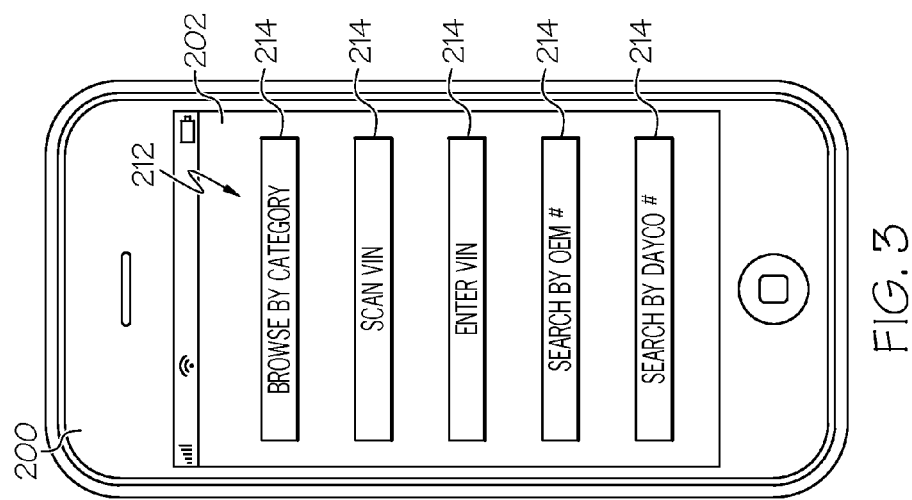
FIG. 3 is a front plan view of one embodiment of an electronic device showing a schematic view of functions available to a user to initiate a component lookup.

As part of accessing the restricted access database 180, the software 150, referring again to FIG. 5, includes a first instruction 152 executable by the electronic device 200 (typically through the I/O circuitry 108 (FIG. 1)) to provide a user a display 212, for example as shown in FIG. 3, from which he/she may select a means for a vehicle part lookup 214 from the restricted access database 180. The software 150 includes a second instruction 154 executable by the electronic device 200 (typically through the communications circuitry 110 (FIG. 1)) to export the access code 156 from memory 106 (FIG. 1) and any information proved in response to the selection of the means for the vehicle part lookup 214 to an external source 178. The third instruction 156 of the software 150 is executable by the electronic device 200 to import data from the restricted access database 180 about a vehicle part found during the user selected vehicle part lookup. The fourth instruction 158 is executable by the electronic device to display the data returned from the restricted access database 180 on screen 202 of the electronic device 200.

After execution of the first instruction 152, the display 202 is of the means for the component lookup 214, for example as seen in FIG. 3. The means for the component lookup may include any one or more of the following: a browse by category option, a scan vehicle identification number (VIN) option, an option to manually enter the VIN, and an option to search by the component manufacturer's part number and/or the part number of an original equipment manufacturer, but is not limited thereto. Once this screen is displayed, the user may select one of these means for component lookup 214. The particular means for component lookup selected will result in the software 150 executing a fifth instruction 162 (FIG. 5) executable by the electronic device 200 to display prompts requesting information related to the means for the component lookup. Example screen displays for each of the means for component lookup listed above are provided in FIGS. 4A-4E.

When the user responds to one of the prompts requesting information related to the means for the component lookup by inputting information, a "user input" is created and may be temporarily saved in the memory 106 (FIG. 1) of the electronic device 100, 200. With respect to one or more of the means for component lookup 214 (FIG. 3), the software 150 optionally includes a sixth instruction 164, represented in FIG. 5, executable by the electronic device 200, after the fifth instruction 158, to display the user input along with a prompt for the user to verify that said user input is correct.

In one embodiment, the second instruction 154 includes a route or URL to an external decoder 182 to convert the user input into vehicle identification information. The second instruction 154 may also include a seventh instruction 166 therein that directs the decoder 182 to send the vehicle identification information to the restricted access database 180 for use in the component lookup. The vehicle identification information may include one or more of, but preferably two or more of, the make, model, year, type, and engine of a vehicle.

In one embodiment, the user input is a VIN. This user input may be entered after either selection of the "scan VIN" or the "manual enter VIN" options as the means for component lookup 214, see FIG. 3. The "manual enter VIN" option prompts the software to display on screen 202 a field 216 for entering the VIN (see FIG. 4C). The user may use an alpha numeric keyboard of the electronic device 200 to enter the VIN. The VIN is then sent to the external decoder 182 per second instruction (and seventh instruction) as discussed above.

Figure 4B:
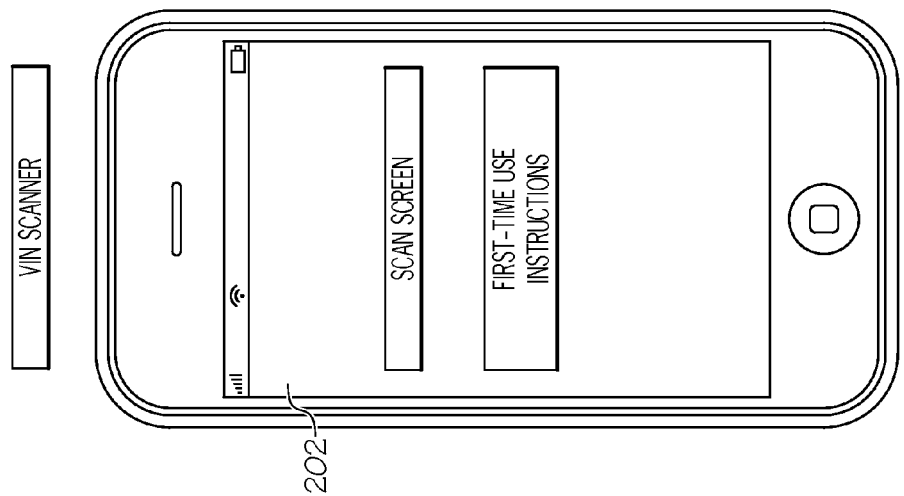
FIG. 4B is a front plan view of one embodiment of an electronic device showing a schematic view of functions available to a user in response to a VIN scanner component lookup.

If the "scan VIN" option is selected the software will display prompts regarding first time instructions and start scan. An example screen display is illustrated in FIG. 4B. The selection of start scan activates a reader, scanner, camera, or other input device 112 (FIG. 1) of the electronic device 100, 200 to input an image of or data contained in a VIN. The image of the VIN is then analyzed by the electronic device 100, 200 using the software 150 to extract the VIN data therefrom (i.e., a number sequence or code). Now, the second instruction 154 can send the VIN data (i.e., the user input) to the decoder 182 as explained above. The decoder 182 will decode the VIN data into one or more of the make, model, year, type, and engine of a vehicle, hereinafter referred to as the "decoded vehicle information."

The decoded vehicle information whether as a result of the scan VIN or manually entered VIN, may be sent back to the electronic device 200 for verification of its correctness by the user. The software may also include instructions to display the decoded vehicle information along with a prompt asking the user if they would like to store the decoded vehicle information in the electronic device (in memory 106 (FIG. 1)). Thus, in the future the user can recall the decoded vehicle information from memory 106 to look up additional parts for that particular vehicle.

Figure 4A:
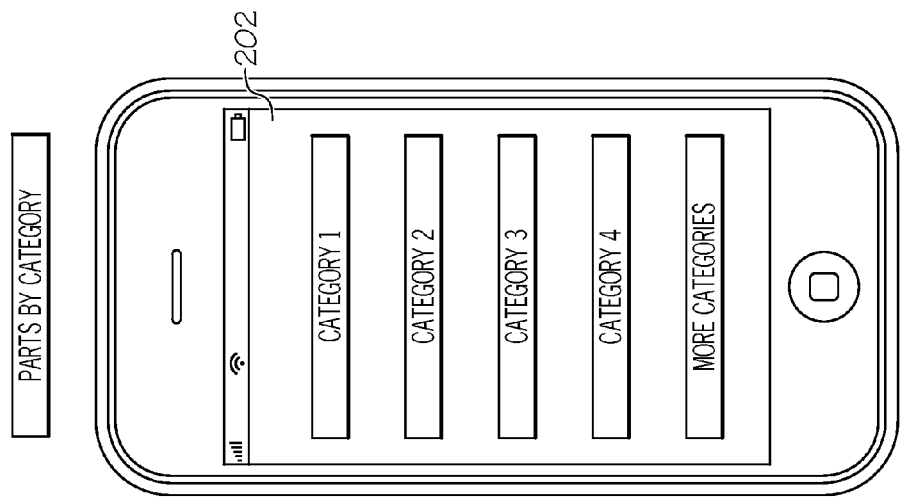
FIG. 4A is a front plan view of one embodiment of an electronic device showing a schematic view of functions available to a user in response to a category based component lookup.

If the user selects "browse by category" as the means for component lookup, the electronic device may display a screen as shown in FIG. 4A, listing the available categories. If the component manufacturer is a vehicle part manufacturer the categories may be directed to different vehicle parts, for example, in the case of Dayco Products, LLC the categories may be timing belts, serpentine belts, pulleys, tensioners, hoses, etc. Alternately, the categories may have a two-tiered approach, where tier 1 is whether the user is interested in light duty, heavy duty, ATV/snow mobile, industrial, lawn and garden, or hydraulics and then within each selected tier 1 a category of specific parts such as timing belts, serpentine belts, pulleys, tensioners, hoses, etc. represents tier 2. For other component manufacturers, the categories can be tailored to the types of components they manufacture and/or the systems in which such components are used. Once a category is selected the software instructs the restricted access database to send back a with a list of parts therein, which are then displayed for user review. Each part within a list may be individually selectable to learn more about that particular part and upon selection of a desired part, data specific to that part may be retrieved from the database and displayed to the end user.

Figure 4E:
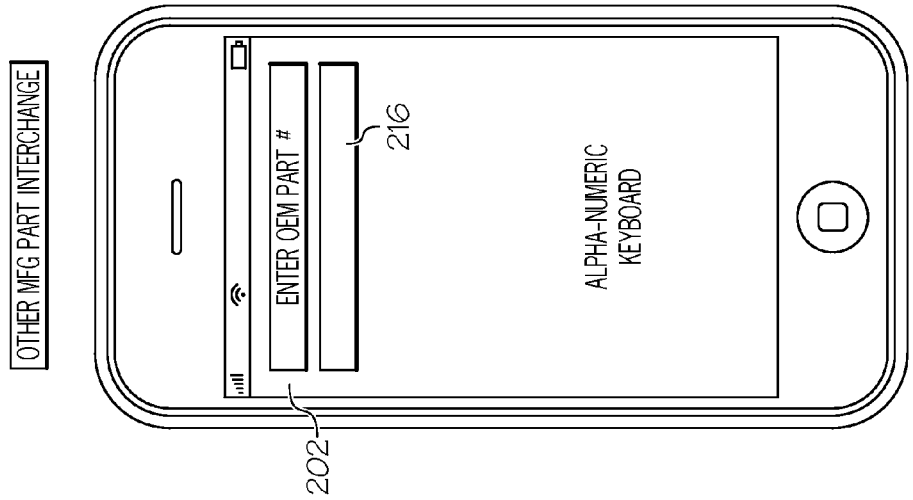
FIGS. 4D and 4E are front plan views of two embodiments of an electronic device showing schematic views of functions available to a user in response to various part number component lookups.
Figure 4D:
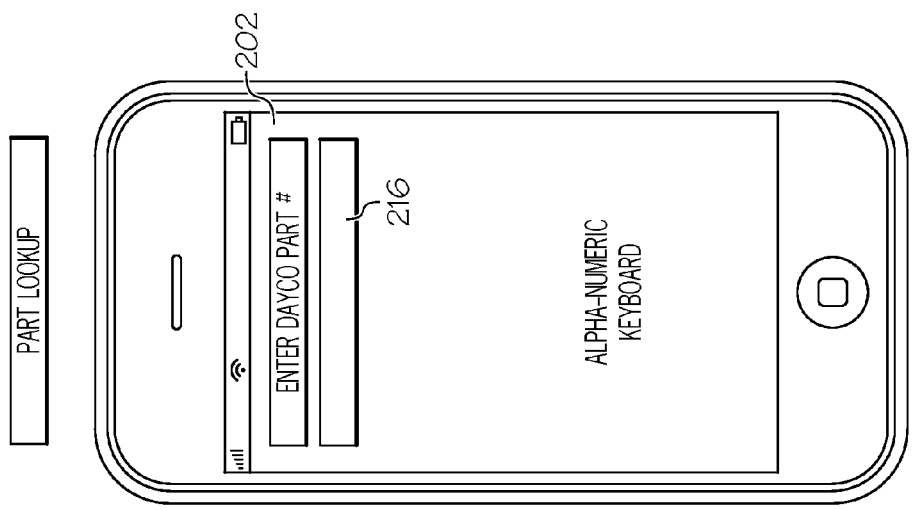
Figure 4C:
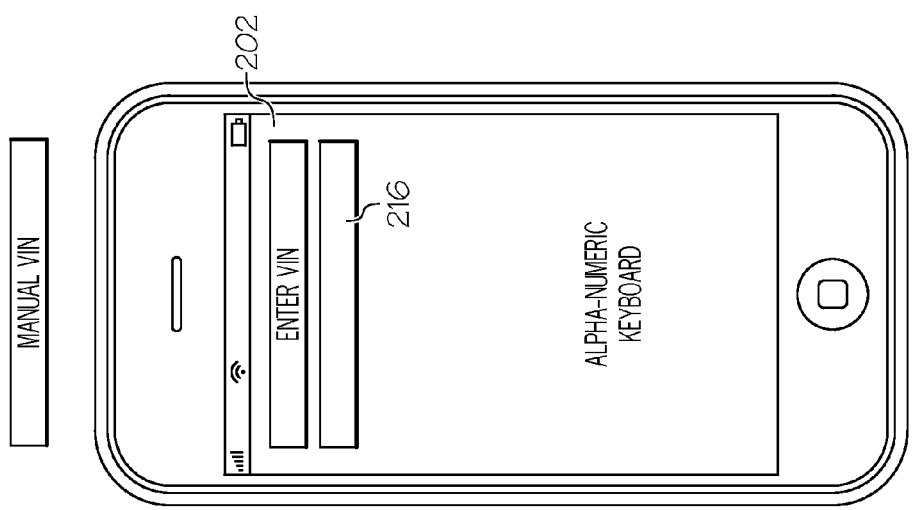
FIG. 4C is a front plan view of one embodiment of an electronic device showing a schematic view of functions available to a user in response to a manual VIN component lookup.

Similarly to the manually entered VIN number, the user may select to manually enter and search by the manufacturer's part number and/or the part number of an original equipment manufacturer, see FIG. 3. For either type of part number lookup, the software 150 instructs the electronic device 100, 200 to display on screen 202 a field 216 for entering the number. The user may enter the number using an alpha numeric keyboard of the electronic device 200. Example screen displays are illustrated in FIGS. 4D and 4E. The part numbers via the second instruction 154 of the software 150 can be sent directly to the restricted access database 180 along with the access code. There is no need for the part number to be sent to decoder 182. The restricted access database 180, after verification of the access code, will send data related to the part number to the electronic device 100, 200 for display per the software's third and fourth instructions 156, 158 (FIG. 5).

The fourth instruction 158 to display the vehicle data may include a displayable prompt to place an order. This prompt may be displayable only when the availability of the component indicates said components are available. If the part is not available, the display may display an out-of-stock message, a not found message, or a discontinued message, whichever is appropriate. If the user is a direct customer, the prompt to order may include the component's price at the direct customer price. Alternatively, the fourth instruction 158 may include a displayable list of the component's availability at local vendors/authorized distributors. If the component is not found in the database, the database will send a message that tells the communications circuitry to have the I/O circuitry display a message regarding the unavailability of the component.

The software 150 may also include additional options for the user. The options may include a "Where to Buy" lookup, "a Learning Center" and an "Information" screen. Where to Buy includes a lookup of retail locations where the products of the identified component manufacturer are sold. The list of retail locations may include information regarding the retail location, driving instructions, phone numbers, store hours, etc. The Learning Center may include general technical information relative to the various components made by the identified component manufacturer. An example display for a Learning Center relative to Dayco Products, LLC is provided in FIG. 6. Here, the topics for the Learning Center include timing belts, serpentine belts, belt noise, hose, and tensioners and pulleys. The Information screen may provide the option to call or e-mail the identified component manufacturer or visit their website from the electronic device.

Figure 6:
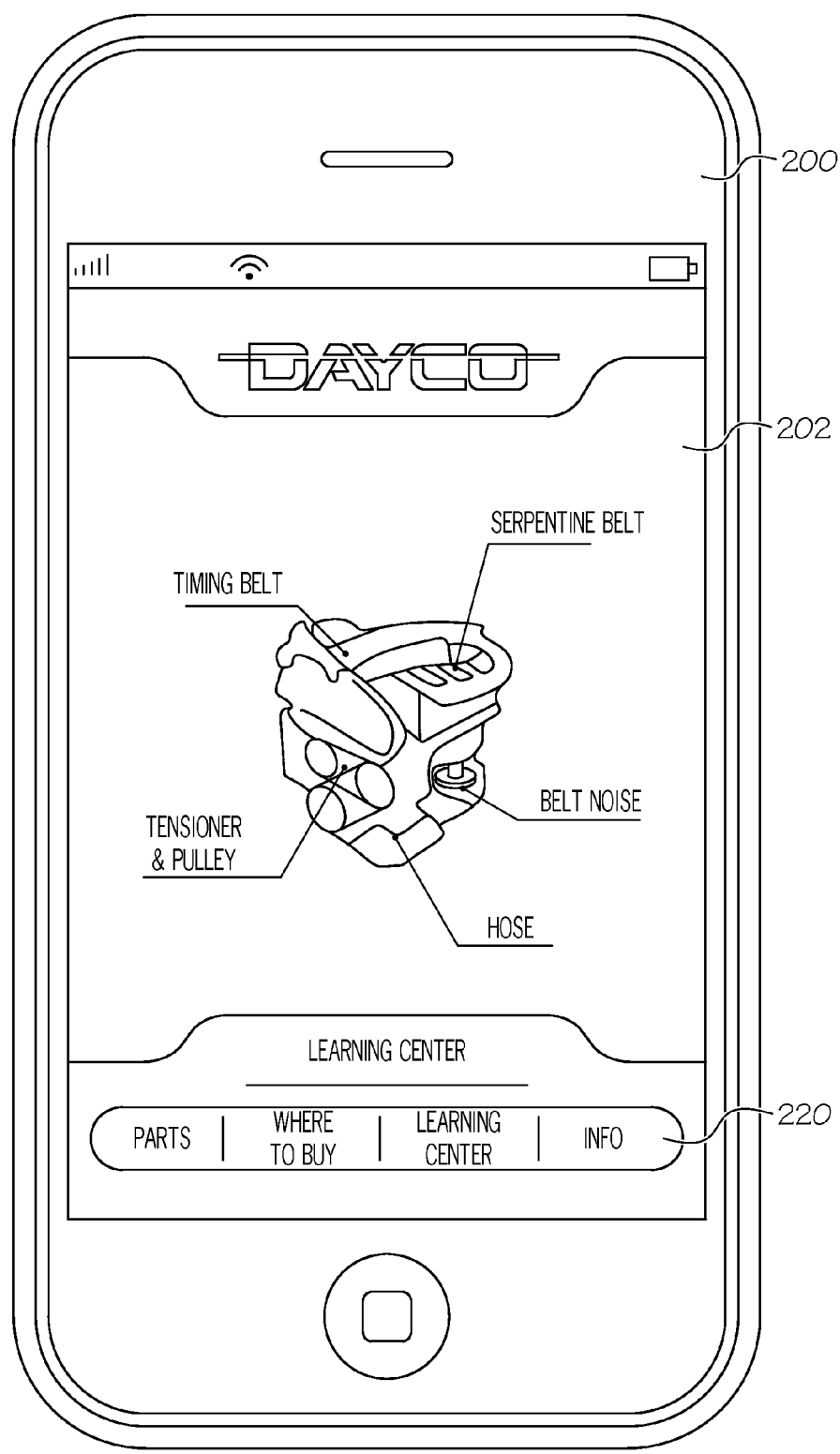
FIG. 6 is a front plan view of one embodiment of an electronic device showing a schematic view of functions available to a user in a learning center directed to topics related to the component manufacturer.

Referring to FIG. 6, the software 150 may also include instructions for the I/O circuitry 108 (FIG. 1) to display a ribbon 220 on the screen 202 comprising prompts for navigating between the various features of the component lookup program. The ribbon may include prompts to navigate to "Part Finder" (the screen with the list of means for component lookup, such as FIG. 3), the "Where to Buy" described above, the "Learning Center" described above, and "Information" described above.

In one aspect, the inventions herein include electronic devices having the capability to store and implement the software 150 described above. In one embodiment, the electronic device 100, as illustrated in FIG. 1, includes a device 112 such as a scanner, reader, or camera (or a plurality thereof) for importing a vehicle identification number (VIN) or code containing said VIN into the electronic device 100, communication circuitry comprising signal transmitting and signal receiving capability, an information processor to process the information received by the signal receiving capability of the communication circuitry into a displayable form, and a display to display the information once in a displayable form. The signal transmitting capability sends the VIN to a restricted access database external to the electronic device 100 to lookup component information related to the VIN and the signal receiving capability receives information sent back to the electronic device in response to the lookup of component information. The electronic device 100 includes software 150, which includes an access code that the restricted access database will verify before allowing the retrieval of information stored therein.

The information stored in the restricted access database and retrievable in response to a VIN includes one or more of photographs, videos, documents, audio recordings, individual data points, and combinations thereof, including the example types of information disclosed above, for components associated with the VIN. The database may also include any other types of information discussed above.

The communication circuitry 110 (FIGS. 1 and 5) sends the VIN to a decoder 182 external to the electronic device to decode the VIN into one or more of the make, model, year, type and engine of the vehicle (referred to as "vehicle identification information"), receives the vehicle identification information from the decoder 182, and the information processor displays said vehicle identification information along with a prompt for the user of the electronic device to verify the correctness thereof. Then, in response to a favorable response to the prompt to verify the correctness of the vehicle identification information, the information processor instructs the communication circuitry to send the vehicle identification information to the restricted access database to retrieve component information relative thereto. The component information is then received by the electronic device, more specifically the communications circuitry, and is displayed on the screen for the user. The component information typically includes one or more of part numbers, part names, and images of the part.

The electronic device as seen in FIG. 1 also includes memory 106. The information processor may display the vehicle identification information with a prompt for the user of the electronic device to save the vehicle identification information in the electronic device (i.e., memory 106).

In one embodiment, the electronic device 100 is a point-of-sale (POS) device equipped with a component lookup software 150 and a VIN input device 112 discussed above (see FIG. 1). The point-of-sale device operates similarly to the electronic devices described above. The difference is the intended user. Here, the user is meant to be a retail establishment, such as an automotive parts store (in particular, its employees) or a distributor. In response to any of the means for component lookup discussed above, the information sent to the POS device from the restricted access database or password protected server (described in detail below) can include the availability of the component from the component manufacturer (i.e., how many parts are in stock and date parts could ship), the particular retailer's or distributor's price for the component, and an option to place an order. Additionally, if the component manufacturer does not have the component in stock, the database may send information to the electronic device regarding other distributors or retailers that may have the component in their inventories, along with their contact information.

In another aspect, the invention encompasses methods for accessing the contents of a component manufacturer's database of component-related information. The methods include the steps of providing software that is storable in an electronic device, providing a database of component-related data specific to the component manufacturer stored on a password protected server, and providing a mobile site as a communication link between the electronic device and the database. The software enables a user to initiate a component lookup by a plurality of options. The options may include one or more of browsing a catalog, scanning or reading a vehicle identification number (VIN), manually entering a VIN, entering a part number of the component manufacturer, entering another manufacturer's part number or part name, and entering dimensions of a component within a category of components. The electronic device and the restricted access database communicate by having the electronic device communicate with the mobile site and the mobile site accesses the database in response to the user initiated component lookup (in response to the user's selection of one of the options listed above). The software instructs the electronic device to communicate with the database to use the user initiated component lookup to lookup component related data stored therein and to send said data to the electronic device for display.

In one embodiment, the password protected server is at least a webserver having the database stored as a web service. For this embodiment, the method includes a step where the mobile site calls the web service for each user initiated component lookup and provides a password to the web service. The web service then authenticates the password and thereafter sends data related to the component(s) selected during the user initiated component lookup to the mobile site, which relays the data to the electronic device.

In another embodiment, the password protected server is at least a File Transport Protocol (FTP) server having the database stored as comma-separated value files. Here, the method may include the step of accessing the database, once daily, with a password and copying the database to a cloud server. With the data stored in the cloud server, the mobile site can call the cloud server for each user initiated component lookup without using a password. This method will increase the speed of the component lookup.

In either of these embodiments, the mobile site may include a VIN decoder or be in communication with a VIN decoder. When a user initiates a component lookup by importing a VIN image or code or by manually entering a VIN, the method also includes the step of decoding the VIN (using the decoder) into vehicle identification information and then sending the vehicle identification information to the electronic device for display and verification by the user. When the decoder is external to the mobile site, the mobile site sends the VIN to the external decoder and receives therefrom the vehicle identification information. The mobile site will thereafter send the vehicle identification information to the electronic device for display and verification by the user. Once verified, the electronic device, as explained above, will send the vehicle identification information to the database to lookup component information/data related thereto.

The embodiments of this invention shown in the drawings and described above are exemplary of numerous embodiments that may be made within the scope of the appended claims. It is contemplated that numerous other configurations of the software, electronic devices, and methods of component lookup in a restricted access database of an identified component manufacturer may be created by taking advantage of the disclosed approach. In short, it is the applicant's intention that the scope of the patent issuing herefrom will be limited only by the scope of the appended claims.

What is claimed is:

1. A portable, handheld electronic device comprising:
   a device for importing a vehicle identification number (VIN) or a code containing said VIN as an image thereof, the device comprising at least one of a scanner, a reader, and a camera;
   an information processor to extract VIN data from the image imported by the device;
   communication circuitry comprising signal transmitting and signal receiving capability, wherein the signal transmitting capability sends the VIN to a database external to the electronic device to lookup component information related to the VIN and the signal receiving capability receives information sent back to the electronic device in response to the lookup of component information;
   a memory in communication with the information processor;
   software and a password unique to the software that grants access to a restricted access database of component-related information of an identified component manufacturer embodied in the memory, the software comprising instructions to export the password through the communication circuity along with the VIN or the component information related to the VIN;
   wherein the information processor processes the information received by the signal receiving capability of the communication circuitry into a displayable form; and
   a display to display the information once in a displayable form;
   wherein the information received is from the restricted access database of component-related information from an identified component manufacturer.

2. The portable, handheld electronic device of claim 1, wherein the information received includes photographs, videos, documents, audio recordings, individual data points, and combinations thereof related to the components associated with the VIN.

3. The portable, handheld electronic device of claim 1, wherein the communication circuitry sends the VIN to a decoder external to the electronic device to decode the VIN into one or more of make, model, year, type and engine of the vehicle, receives the one or more of the make, model, year, type and engine, and the information processor displays said make, model, year, type and engine along with a prompt for the user of the electronic device to verify the correctness thereof.

4. The portable, handheld electronic device of claim 3, wherein the information processor in response to a favorable response to the prompt to verify the correctness instructs the communication circuitry to send the make, model, year, type and engine information to the restricted access database to retrieve component information relative thereto.

5. The portable, handheld electronic device of claim 4, wherein the component information relative thereto includes one or more of part numbers and part names.

6. The portable, handheld electronic device of claim 3, further comprising storage, wherein the information processor displays the one or more of the vehicle make, model, year, type and engine along with a prompt for the user of the electronic device to save the vehicle identification information in the storage of the electronic device.

7. A method for accessing the contents of a component manufacturer's restricted access database of part-related information, the method comprising:
- providing software and a password unique to the software that grants access to a restricted access database of part-related information of an identified component manufacturer that are storable in a portable, handheld electronic device having at least one of a scanner, a reader, and a camera, wherein the software enables a user to initiate a component lookup by activating at least one of the scanner, the reader, and the camera to import an image of a vehicle identification number (VIN), extracts VIN data from the image, sends the VIN data to a VIN decoder, and receives identification information from the VIN decoder;
- providing the restricted access database of part-related data specific to one component manufacturer stored on a password protected server; and
- providing a mobile site as a communication link between the portable, handheld electronic device and the database;
- wherein the mobile site accesses the database in response to the user initiated component lookup;
- wherein the software instructs the portable, handheld electronic device to export the password to the password protected server and the password protected server verifies the password; and
- wherein the software instructs the portable, handheld electronic device, subsequent to verifying the password, to communicate with the database to use the identification information from the VIN decoder to lookup component related data stored therein and to send said data to the electronic device for display.

8. The method of claim 7 wherein the password protected server is at least a webserver having the database stored as a web service; and the method further comprising the mobile site calling the web service for each user initiated component lookup and providing the password thereto, and the web service authenticating the password and thereafter sending said data to the mobile site for relaying to the electronic device.

9. The method of claim 7 wherein the password protected server is at least an FTP server having the data stored as comma-separated value files.

10. The method of claim 7 wherein the mobile site includes the VIN decoder, the method further comprising the mobile site decoding the VIN data into identification information related to the vehicle and sending the identification information to the portable, handheld electronic device for display and verification by the user.

11. The method of claim 7 further comprising the mobile site receiving from the VIN decoder identification information relating to the vehicle, and sending the identification information to the electronic device for display and verification by the user.

12. The method of claim 7 wherein the software further enables a user to initiate a component lookup by one or more of browsing a catalog, manually entering a VIN, entering a part number, and entering another manufacturer's part number or part name.

13. A method for accessing the contents of one component manufacturer's database of part-related information particular to that component manufacturer, the method comprising:
- providing software that is storable in a portable, handheld electronic device having at least one of a scanner, a reader, and a camera, wherein the software enables a user to initiate a component lookup by activating at least one of the scanner, the reader, and the camera to import an image of a vehicle identification number (VIN), extracts VIN data from the image, sends the VIN data to a VIN decoder, and receives identification information from the VIN decoder;
- providing a database of part-related data specific to only one component manufacturer stored on a password protected FTP server having the data stored as comma-separated value files;
- providing a mobile site as a communication link between the portable, handheld electronic device and the database;
- accessing the database, once daily, with a password and copying the database to a cloud server; and
- having the mobile site call the cloud server for each user initiated component lookup without a password;
- wherein the software instructs the portable, handheld electronic device to communicate with the database copied to the cloud server to use the identification information from the VIN decoder to lookup component related data stored therein and to send said data to the electronic device for display.

* * * * *